US009485163B1

(12) United States Patent
Fries et al.

(10) Patent No.: US 9,485,163 B1
(45) Date of Patent: Nov. 1, 2016

(54) PREVENTING SPLIT-BRAIN SCENARIO IN A HIGH-AVAILABILITY CLUSTER

(71) Applicant: International Business Machines Corporation, Armonk, NY (US)

(72) Inventors: Justin T. Fries, Raleigh, NC (US); Timothy M. C. McCormick, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/052,908

(22) Filed: Feb. 25, 2016

Related U.S. Application Data

(63) Continuation of application No. 14/943,302, filed on Nov. 17, 2015.

(51) Int. Cl.
| | | |
|---|---|---|
| *G06F 11/00* | (2006.01) | |
| *H04L 12/26* | (2006.01) | |
| *H04L 12/24* | (2006.01) | |
| *H04L 29/08* | (2006.01) | |
| *G06F 11/20* | (2006.01) | |

(52) U.S. Cl.
CPC ......... *H04L 43/0876* (2013.01); *G06F 11/202* (2013.01); *G06F 11/2048* (2013.01); *H04L 41/04* (2013.01); *H04L 67/141* (2013.01)

(58) Field of Classification Search
CPC ........ G06F 11/00; G06F 11/07; G06F 11/14; G06F 11/1425; G06F 11/1428; G06F 11/1675; G06F 11/20; G06F 11/201; G06F 11/2023; G06F 11/2025; G06F 11/2028; G06F 11/203; G06F 11/2033; G06F 11/2043–11/2048; G06F 11/2092; G06F 11/2089; H04L 43/0876; H04L 67/14–67/148; H04L 41/04
See application file for complete search history.

(56) References Cited

U.S. PATENT DOCUMENTS

| | | | |
|---|---|---|---|
| 6,816,493 | B2 | 11/2004 | Shi et al. |
| 8,498,967 | B1 | 7/2013 | Chatterjee et al. |
| 2014/0173330 | A1 | 6/2014 | Samanta et al. |
| 2014/0317440 | A1* | 10/2014 | Biermayr ............ H04L 41/0668 714/4.11 |

OTHER PUBLICATIONS

Fries et al., "Preventing Split-Brain Scenario in a High-Availability Cluster", U.S. Appl. No. 14/493,302, filed on Nov. 17, 2015, pp. 1-30.
IBM Appendix P, list of patents and patent applications treated as related, Jun. 1, 2016, 2 pages.

* cited by examiner

*Primary Examiner* — Michael Maskulinski
(74) *Attorney, Agent, or Firm* — James H. Mayfield

(57) ABSTRACT

As disclosed herein a method, executed by a computer, includes determining, by a processor, that a first node of a HA cluster is unable to communicate with a second node of the HA cluster, and initiating, by a processor, by the first node, a handshake operation with a connected client, wherein the handshake operation comprises requesting that the client determine a status of the second node and receiving, from the client, a response indicating the status of the second node. The method further includes accepting, by a processor, new requests in response to determining that the second node is unavailable, and requesting, by a processor, restoration of communications between the first node and the second node in response to determining that the second node is available. A computer system and computer program product corresponding to the above method are also disclosed herein.

1 Claim, 4 Drawing Sheets

PREVENTING SPLIT-BRAIN SCENARIO IN A HIGH-AVAILABILITY CLUSTER

BACKGROUND

The present invention relates to high-availability clusters, and more particularly to preventing a split-brain scenario in a high-availability cluster.

In the highly computerized world of today, the expectation is that computing environments and services will be available at all times (e.g., 100% availability). One approach to providing high availability is to use high-availability (HA) clusters. HA clusters operate by using high availability software to manage a group of redundant computers (i.e., a cluster). The computers in the HA cluster use failover technology to provide continued service when system components within the cluster fail. HA clusters are often used for critical databases, file sharing on a network, business applications, and customer services such as electronic commerce websites.

SUMMARY

As disclosed herein a method, executed by a computer, includes determining, by a processor, that a first node of a HA cluster is unable to communicate with a second node of the HA cluster, and initiating, by a processor, by the first node, a handshake operation with a connected client, wherein the handshake operation comprises requesting that the client determine a status of the second node and receiving, from the client, a response indicating the status of the second node. The method further includes accepting, by a processor, new requests in response to determining that the second node is unavailable, and requesting, by a processor, restoration of communications between the first node and the second node in response to determining that the second node is available. A computer system and computer program product corresponding to the above method are also disclosed herein.

DETAILED DESCRIPTION

Figure 1:
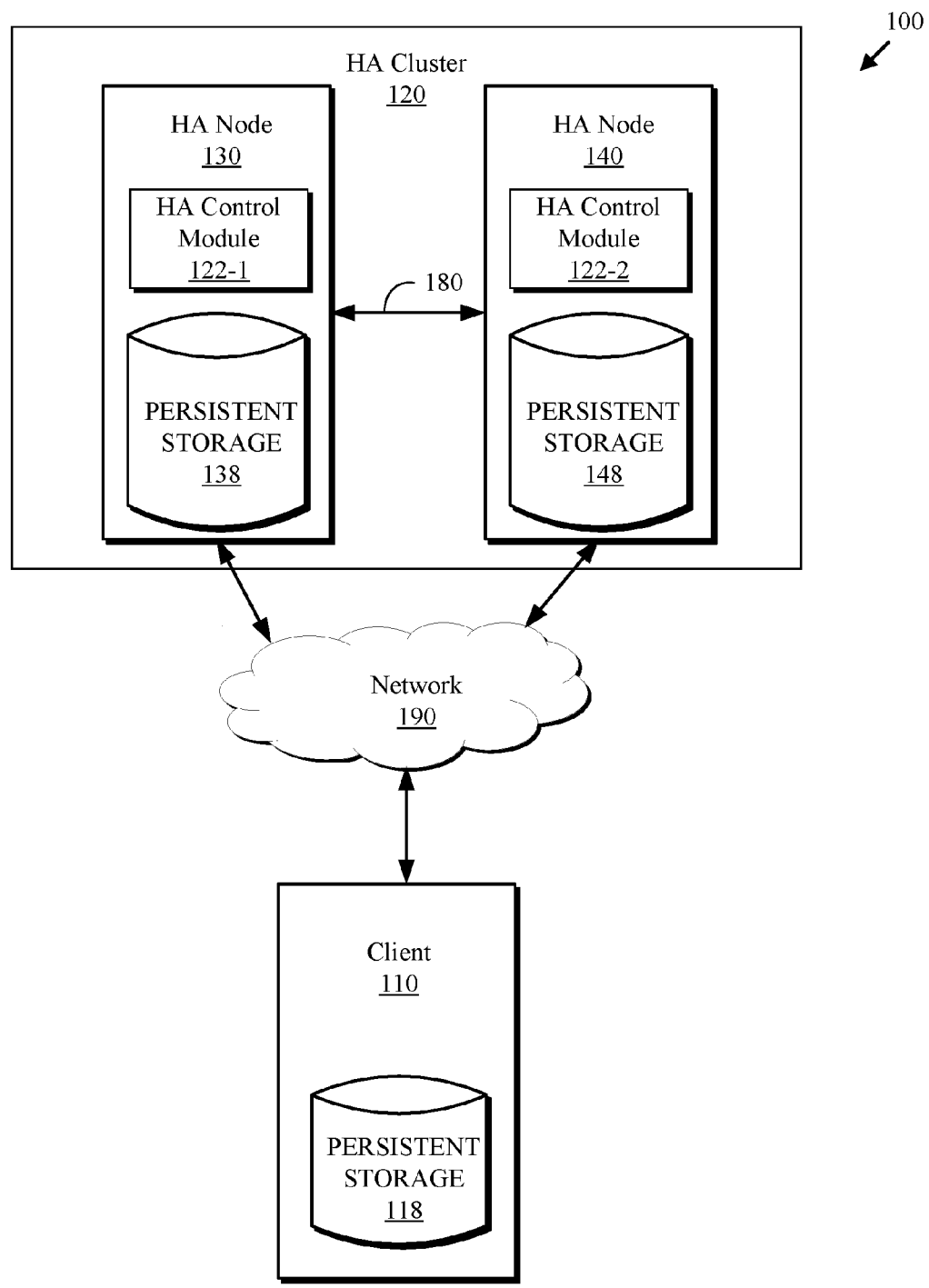
FIG. 1 is a functional block diagram depicting a computing environment, in accordance with at least one embodiment of the present invention.

The everyday life of society as a whole is becoming dependent on computing devices. Individuals use computers on a daily basis to manage and maintain many aspects of their lives. In general, we rely on computers to provide, for example, communication, entertainment, online banking, and online shopping applications. The expectation is that, regardless of the time of day, the application or service will be available.

Providing reliable computing environments is a high priority for service providers. Companies providing online services and applications may use high-availability (HA) clusters to increase or maintain availability of applications and services. An HA cluster may include a group of two or more servers (HA nodes), each capable of providing the same service to one or more clients. HA nodes communicate with each other to determine if any of the HA nodes have failed. In a passive-active HA cluster of two or more HA nodes, the workload for a given service will be directed to only one of the HA nodes (the primary HA node). If the active HA node fails, another node (a failover HA node) in the HA cluster will immediately begin providing the service that the failed HA node was providing.

Without clustering, if a server providing a particular service crashes (fails), the service will be unavailable until the crashed server is fixed. If the service is being provide by an HA clustered environment, and a primary HA node providing a particular service crashes, then a failover HA node within the HA cluster may detect that the primary HA node has become unavailable. Using failover technology, the failover HA node provides the service that was initially being provided by the currently unavailable primary HA node.

Situations may arise where the HA nodes are unable to communicate with each other, however, the HA nodes may still have that ability communicate with clients (users of the services provided by HA cluster). In such situations, each node in the HA cluster may detect that all other nodes in the HA cluster are unavailable and each node may become available, resulting in multiple nodes accepting service requests from clients. This situation is referred to as a split-brain scenario. A split-brain scenario may result in invalid services being supplied and possibly data corruption.

Split-brain may be prevented by using a $3^{rd}$ party system where each node is required to have a connection to the $3^{rd}$ party system. The $3^{rd}$ party system grants permission to one HA node to run by using a locking mechanism (e.g., by obtaining a shared lock via a file system object or a database object) on the $3^{rd}$ party system. The $3^{rd}$ party system controls which HA node holds the lock and therefore is available. Using this approach may eliminate split-brain syndrome because only the $3^{rd}$ party system controls which HA node holds the lock, and therefore allowing only one HA node to be actively providing a service to clients and any given time.

Using the $3^{rd}$ party approach introduces a requirement for additional hardware and software and increased expenses associated with the added hardware and software. Additionally, a single point of failure is introduced. If the $3^{rd}$ party system fails (e.g., becomes unavailable) no HA nodes will be able to obtain the lock, and therefore none of the HA nodes can process the workload. When the $3^{rd}$ party system fails, the entire HA cluster becomes unavailable. The embodiments disclosed herein generally address the above-described problems.

The present invention will now be described in detail with reference to the Figures. FIG. 1 is a functional block diagram depicting a computing environment 100, in accordance with an embodiment of the present invention. Computing environment 100 includes client 110 and high-availability (HA) cluster 120. HA cluster 120 may provide one or more services to client 110. The services provided may include online shopping, online banking, email, video streaming, music downloads, online gaming, or any other services capable of being provided over network 190. HA cluster 120 includes redundant servers (HA node 130 and HA node 140) that are both configured to provide all services offered by HA cluster 120. HA node 130 and HA node 140 may be web servers, mail servers, video servers, music servers, online gaming servers, or any other server known to those of skill in the art.

Client 110, HA node 130, and HA node 140 can include smart phones, tablets, desktop computers, laptop computers, specialized computer servers, or any other computer systems, known in the art, capable of communicating over network 190. In general, client 110, HA node 130, and HA node 140 are representative of any electronic devices, or combination of electronic devices, capable of executing machine-readable program instructions, as described in greater detail with regard to FIG. 4.

As depicted, HA node 130 includes HA control module 122-1 and persistent storage 138, and HA node 140 includes HA control module 122-2 and persistent storage 148. HA control module 122-1 and HA control module 122-2 may be configured to monitor and manage node availability within HA cluster 120. The primary responsibility of HA control modules 122-1 and 122-2 is to assure that one, and only one, HA node is accessible to client 110 at all times.

In some embodiments, HA node 130 and HA node 140 are located proximate to each other (e.g., in the same data center). In other embodiments, HA node 130 and HA node 140 are separated by a great distance. HA control module 122-1 and HA control module 122-2 use connection 180 to communicate with each other to determine that the other node is available (i.e., has not crashed). Connection 180 may be a wired, wireless, or fiber optic connection enabling communication between nodes of HA cluster 120.

HA node 130 and HA node 140 each include persistent storage (e.g., persistent storage 138 and 148). In the depicted embodiment, HA node 130 and HA node 140 each include separate persistent storage. In other embodiments, HA node 130 and HA node 140 access shared network attached storage. In another embodiment, HA node 130 and HA node 140 access shared storage that is procured from a cloud service.

Client 110 may be any client that communicates with HA cluster 120 over network 190. Client 110 may wish to use services provided by HA cluster 120. In some embodiments, client 110 uses an online banking application provided by HA cluster 120. In other embodiments, client 110 uses computational applications to produce analytics reports of customer demographics corresponding to a web application. In the depicted embodiment, client 110 is separated from HA cluster 120. In other embodiments, client 110 is also a server within HA cluster 120 such that client 110 and HA node 130 coexist on a single computer. Client 110, HA node 130, and HA node 140 may be procured from a cloud environment.

Persistent storage 118, 138 and 148 may be any nonvolatile storage device or media known in the art. For example, persistent storage 118, 138 and 148 can be implemented with a tape library, optical library, solid state storage, one or more independent hard disk drives, or multiple hard disk drives in a redundant array of independent disks (RAID). Similarly, data on persistent storage 118, 138 and 148 may conform to any suitable storage architecture known in the art, such as a file, a relational database, an object-oriented database, and/or one or more tables.

Client 110, HA node 130, HA node 140, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between client 110 and HA cluster 120 in accordance with an embodiment of the present invention.

Figure 2:
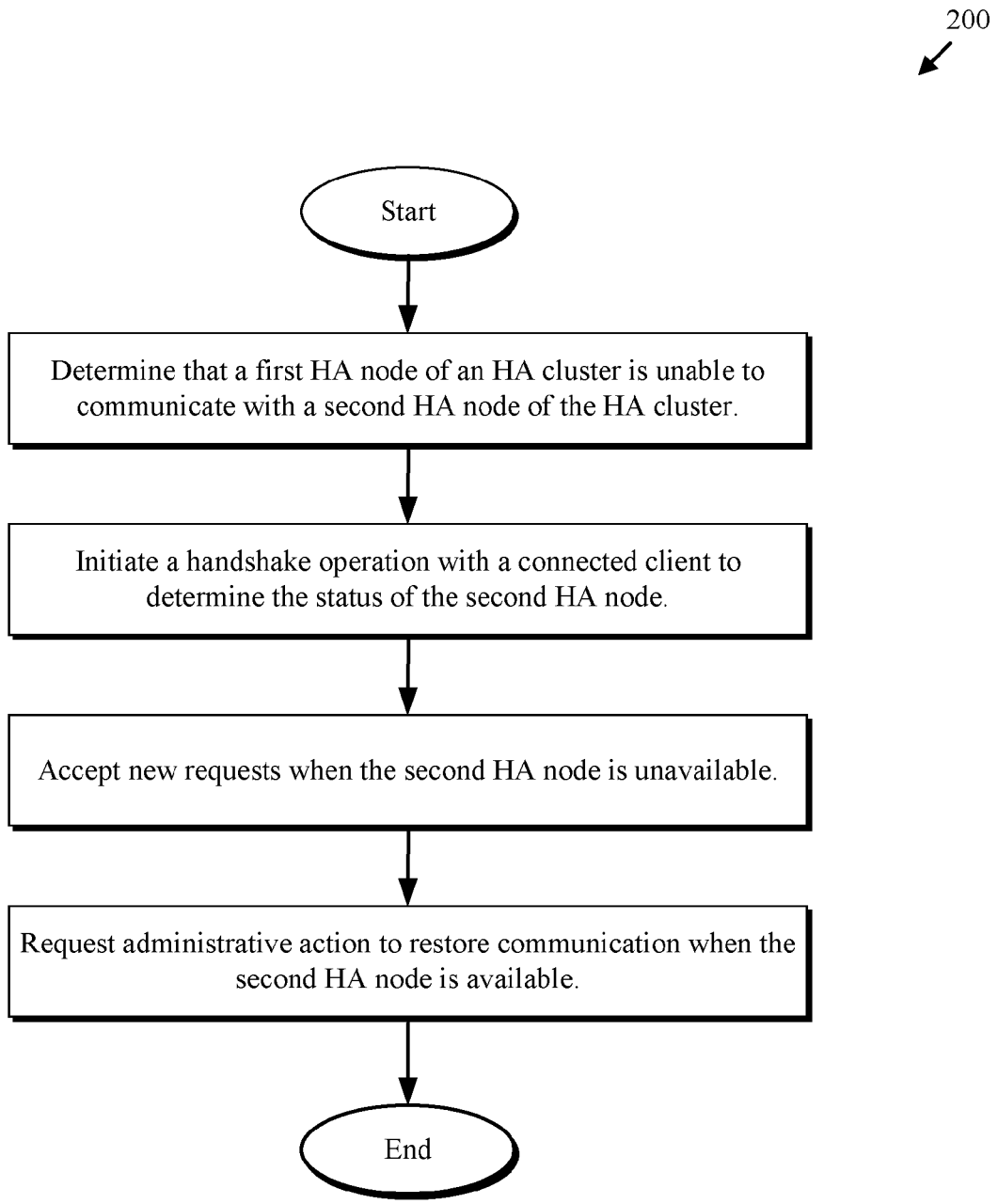
FIG. 2 is a flowchart depicting an HA control method, in accordance with at least one embodiment of the present invention.

FIG. 2 is a flowchart depicting HA control method 200, in accordance with at least one embodiment of the present invention. As depicted, HA control method 200 includes determining (210) that a first HA node is unable to communicate with a second HA node, initiating (220) a handshake operation, accepting (230) new requests, and requesting (240) restoration of communications. As depicted, HA control method 200 avoids a split brain scenario by enabling an HA node to use connected clients to determine the status of other HA nodes in an HA cluster.

Determining (210) that a first HA node is unable to communicate with a second HA node may include HA control module 122-1 attempting to communicate with HA control module 122-2 over connection 180. An HA node may appear to be unavailable if the HA node has encountered errors and has failed (e.g., a hardware or software failure). Alternatively, if the connection (e.g., connection 180) between the first HA node and the second HA node fails (preventing communication) then the second HA node may appear to be unavailable to the first HA node.

In some embodiments, a heartbeat protocol is used to detect the availability of HA nodes within an HA cluster. A heartbeat protocol may be a periodic signal (i.e., a heartbeat) generated by hardware or software to indicate normal operation of an HA node. The heartbeat may be sent between HA nodes at a regular interval. If a heartbeat isn't received for a selected duration (e.g., 3 heartbeat intervals), then the HA node that should have sent the heartbeat is assumed to be unavailable. In some embodiments, only a primary HA node(s) (e.g., a node currently providing services to clients) provides a heartbeat, indicating to failover HA nodes that the primary node(s) is available. In other embodiments, each node in an HA cluster provides a heartbeat indicating availability.

Initiating (220) a handshake operation may include, HA control module 122 determining that a primary HA node (e.g., HA node 140) may be unavailable, and then requesting that one or more connected clients confirm the status of the primary HA node using a handshake operation. The purpose of the handshake operation is to determine the reason that the primary HA node is unable to be reached by the failover HA node. The primary HA node may have failed (e.g., a hardware or software failure). Alternatively, the connection between the two HA nodes (e.g., connection 180) may have failed causing the two HA nodes to be unable to communicate with each other, however, both nodes may still be fully operational and able to communicate with clients (e.g., client 110).

If a client is also unable to communicate with the primary HA node, then HA control module 122 may receive a response from the client indicating a status of inactive corresponding to the primary HA node. However, if the client is able to communicate with the primary HA node, then HA control module 122 may receive a response from the client indicating a status of active corresponding to the primary HA node. In some embodiments, the client uses a networking ping test to determine if the primary HA node is available. If the primary HA node responds to the ping test, then the primary HA node is active. If the primary HA node does not respond to the ping test, then the primary HA node is assumed to be inactive. In other embodiments, a client sends a message to the primary HA node requesting specific statistics indicating the current health of the primary HA node.

In some embodiments, HA control module 122 requires all connected clients to perform the handshake operation. In other embodiments, HA control module 122 requires both connected clients and clients initiating a new connection (new clients) to perform the handshake operation. In some embodiments, in response to receiving a response from any client indicating an active status, HA control module 122 determines that the primary HA node is available. In some embodiments, in response to receiving responses from a selected number of clients indicating an inactive status, HA control module 122 determines that the primary HA node is unavailable. In other embodiments, in response to receiving responses from clients indicating a status of inactive for a selected duration (e.g., 5 seconds), HA control module 122 determines that the primary HA node is unavailable.

Accepting (230) new requests may include HA control module 122 determining that a primary HA node (e.g., HA node 140) is unavailable, and therefore enabling the failover operations of a failover node (e.g., HA node 130). Failover technology may enable the failover node to assume the role of a primary HA node and provide services that were initially provided by the unavailable HA node. In some embodiments, when a failover operation occurs, the HA node performing the failover operation becomes the primary HA node, and when the unavailable HA node is repaired, the repaired HA node becomes the failover HA node. In other embodiments, when an unavailable primary HA node is repaired, the repaired HA node reassumes the primary HA node operations.

Requesting (240) restoration of communications may include HA control module 122 determining that an unreachable actually active and preventing the failover HA node (e.g., HA node 130) from initiating failover operations. If failover HA node were to initiate failover operation, both the primary HA node and the failover HA node may active, causing a split brain scenario. In some embodiments, HA control module 122 sends alerts to one or more system administrators indicating the communication disruption over connection 180 and requesting that action be taken to resolve the disruption. In some embodiments, HA control module 122 initiates an auto problem analysis and diagnostic operation in an attempt to diagnose and resolve the communication issue via an automated means. In other embodiments, HA control module 122 initiates a shutdown operation on the failover HA node to reduce the risk of a split brain scenario occurring during the communication disruption.

In some embodiments, HA nodes are configured using a connection pair list, where the HA nodes are maintained in redundant pairs with one HA node being the primary HA node and the other being the HA failover node. In other embodiments, multiple HA nodes in an HA cluster (e.g., HA cluster 120) are each active, and each HA node is the primary provider of one or more unique services. Each of the active HA nodes may also act as a failover HA node to one or more HA nodes within the HA cluster.

Figure 3A:
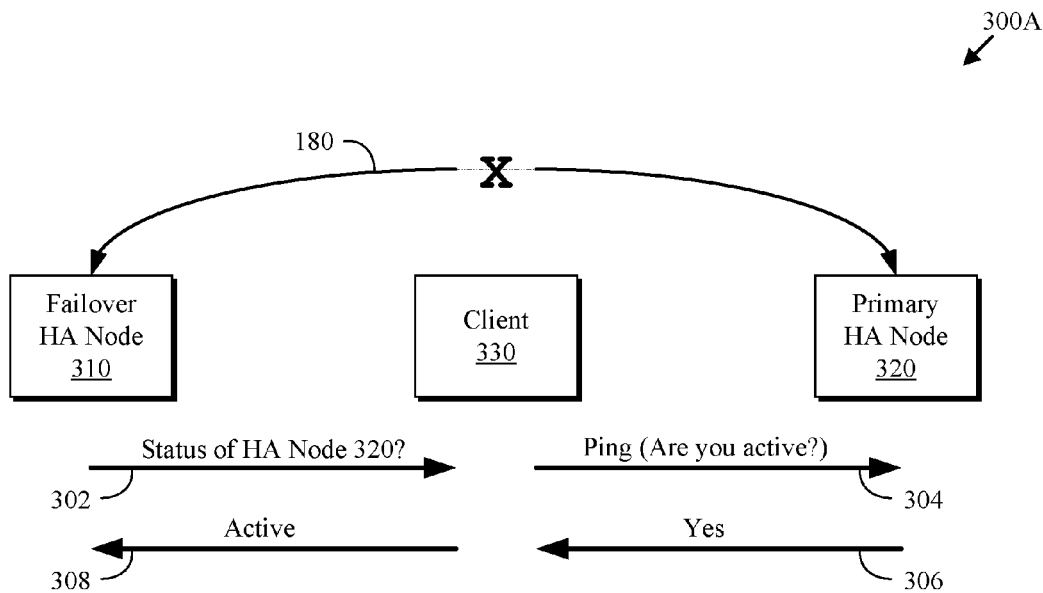
FIG. 3A depicts an example of two active HA nodes losing contact with each other, in accordance with at least one embodiment of the present invention.

FIG. 3A depicts an example 300A of two active HA nodes losing contact with each other, in accordance with at least one embodiment of the present invention. As depicted, connection 180 is a communication link between primary HA node 320 and failover HA node 310. Primary HA node 320 may be sending out heartbeat indicators, over connection 180, to failover HA node 310 indicating that primary HA node 320 is healthy (e.g., active and available). However, connection 180 has failed, and failover HA node 310 is not receiving the heartbeat indicators from primary HA node 320. As a result, failover HA node 310 detects that primary HA node 320 may be unavailable.

If primary HA node 320 has failed, then failover operations may be required. In an attempt to determine if primary HA node has failed, failover HA node 310 initiates a handshake operation with client 330. The handshake operations begins with failover HA node 310 requesting (302) that client 330 to attempt to determine the status (active or inactive) of primary HA node 320. Client 330 uses a network ping command 304, to determine if primary HA node 320 is active. Client 330 receives a response 306 from primary HA node 320 indicating that primary HA node 320 is active. Failover HA node 310 receives response 308 from client 330 indicating that primary HA node is active. In an effort to avoid a split brain scenario, failover HA node 310 will not enable failover operations. In addition, failover HA node 310 may notify one or more administrators that connection 180 has failed.

Figure 3B:
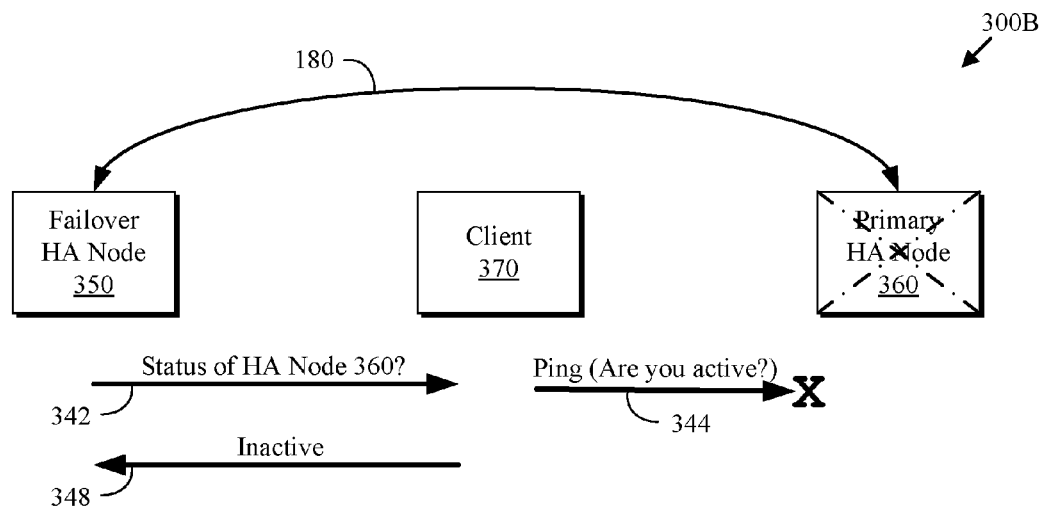
FIG. 3B depicts an example of an HA node becoming unavailable, in accordance with at least one embodiment of the present invention.

FIG. 3B depicts an example 300B of an HA node becoming unavailable, in accordance with at least one embodiment of the present invention. As depicted, connection 180 is a communication link between primary HA node 360 and failover HA node 350. When operational, primary HA node 360 may be sending out heartbeat indicators, over connection 180, to failover HA node 350 indicating that primary HA node 360 is healthy (e.g., active and available). However, in the depicted example, primary HA node 360 has failed, and failover HA node 350 is not receiving the heartbeat indicators from primary HA node 360. As a result, failover HA node 310 detects that primary HA node 320 may be unable.

If primary HA node 360 has failed, then failover operations may be required. In an attempt to determine if primary HA node has failed, failover HA node 350 initiates a handshake operation with client 370. The handshake operations begins with failover HA node 350 requesting (342) that client 370 to attempt to determine the status (active or inactive) of primary HA node 360. Client 370 uses a network ping command 344, to determine if primary HA node 360 is active. Client 370 receives no response from primary HA node 360 indicating that primary HA node 360 is inactive. Failover HA node 350 receives response 348 from client 330 indicating that primary HA node is inactive. Failover HA node 350 initiates failover operations to continue providing the services that were previously provided by primary HA node 360. Failover HA node may continue to provide the services until primary HA node 360 is repaired and becomes active.

Figure 4:
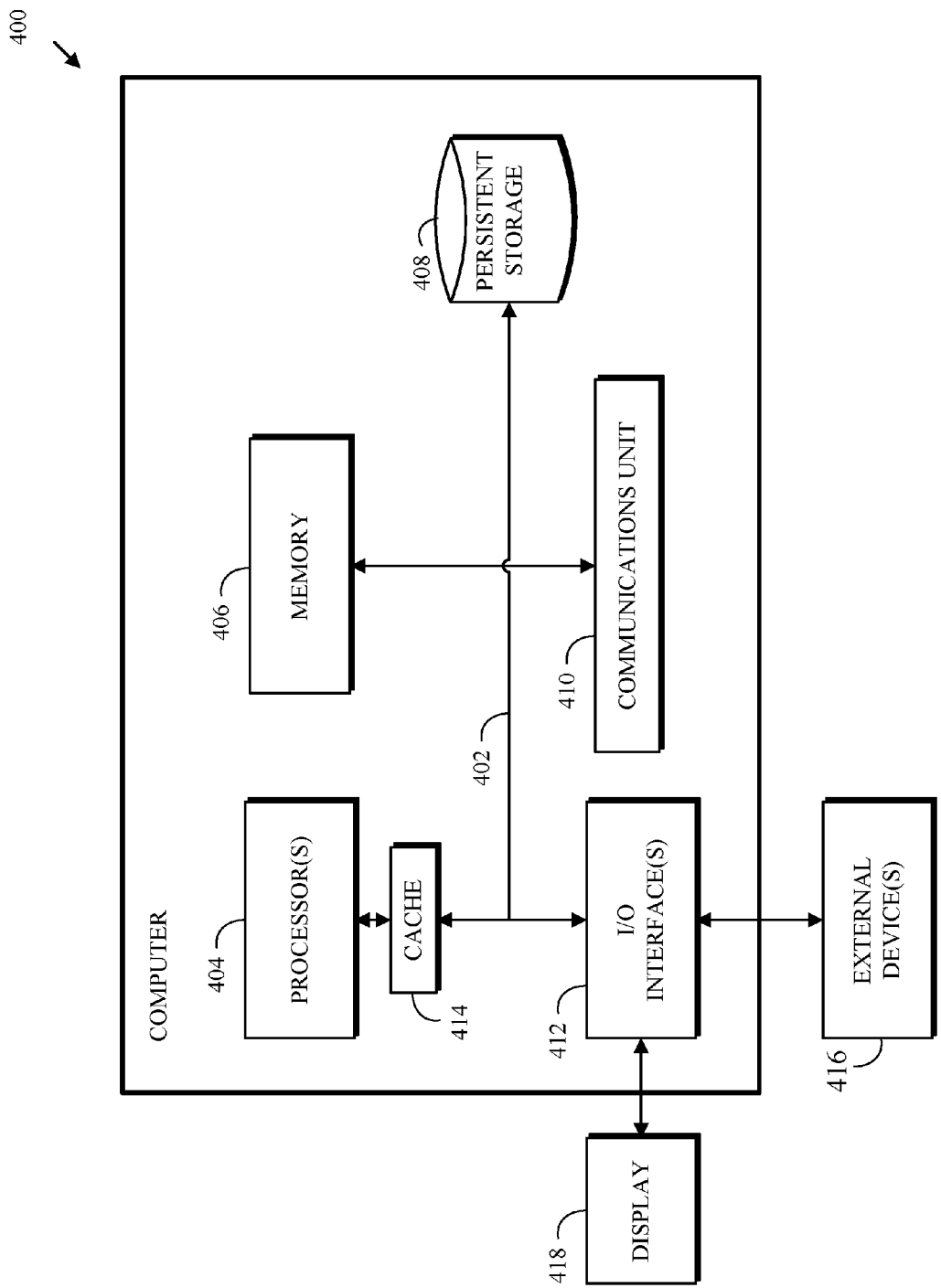
FIG. 4 is a functional block diagram depicting various components of one embodiment of a computer suitable for executing the methods disclosed herein.

FIG. 4 depicts a functional block diagram of components of a computer system 400, which is an example of systems such as client 110, HA node 130, and HA node 140 within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Client 110, HA node 130, and HA node 140 include processor(s) 404, cache 414, memory 406, persistent storage 408, communications unit 410, input/output (I/O) interface (s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., HA control method 200 are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client 110, HA node 130, and HA node 140. In these examples, communications unit 410 includes one or more network interface cards. Communications unit 410 may provide communications through the use of either or both physical and wireless communications links. Program instructions and data used to practice embodiments of HA control method 200 may be downloaded to persistent storage 408 through communications unit 410.

I/O interface(s) 412 allows for input and output of data with other devices that may be connected to each computer system. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for preventing split-brain scenario, executed by one or more processors, the method comprising:
   determining, by a processor, that a first node of a high availability (HA) cluster is unable to communicate with a second node of the HA cluster;
   initiating, by a processor on the first node, a handshake operation with each of one or more connected clients, wherein the handshake operation comprises requesting that the one or more connected clients determine a status of the second node, and receiving, from the one or more connected clients, a response indicating the status of the second node, wherein the status is either active or inactive;
   initiating, by a processor on the first node, a handshake operation with a new client that is initiating a connection with the first node;
   accepting, by a processor on the first node, new requests, in response to determining that the second node is unavailable, wherein the second node is unavailable if, over a selected duration, the response from each of the one or more connected clients indicates an inactive status, and wherein the second node is available if the response from at least one client indicates an active status; and
   responsive to determining that the second node is available, requesting, by a processor, restoration of communications between the first node and the second node, by notifying one or more system administrators of a communication problem between the first node and the second node.

* * * * *